US006456794B1

(12) United States Patent
Yoshida

(10) Patent No.: US 6,456,794 B1
(45) Date of Patent: *Sep. 24, 2002

(54) DISTANCE-MEASURING APPARATUS

(75) Inventor: Hideo Yoshida, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,801

(22) Filed: Jan. 20, 2000

(30) Foreign Application Priority Data

Jan. 22, 1999 (JP) .............................. 11-014395

(51) Int. Cl.[7] .................... G03B 3/00; G03B 13/00; G01C 3/08; G02B 27/40; G02B 27/64
(52) U.S. Cl. ..................... 396/106; 396/98; 396/120; 356/3.04; 356/4.01; 250/201.4; 250/201.6
(58) Field of Search .................... 396/98, 106, 120; 356/3.04, 3.03, 3.01, 4.01; 250/201.4, 201.6

(56) References Cited

U.S. PATENT DOCUMENTS 5,659,387 A * 8/1997 Yoshida ...................... 356/4.01
6,026,246 A * 2/2000 Yoshida et al. ............. 396/106
6,313,907 B1 * 11/2001 Yoshida ...................... 356/4.03

* cited by examiner

*Primary Examiner*—David M. Gray
*Assistant Examiner*—Rochelle Blackman
(74) *Attorney, Agent, or Firm*—Leydig, Voit & Mayer, Ltd.

(57) ABSTRACT

Distance measurement operations are executed by carrying out projection of light from IRED 4, reception of light by PSD 5, arithmetic operation by an arithmetic unit, and integral operation by an integrator plural times, and thereafter a detector detects the distance to a measured object, based on results of the respective distance measurement operations. Precharge of integrating capacitor 6 is carried out prior to the first distance measurement operation, but the precharge is not carried out prior to the second and subsequent distance measurement operations.

16 Claims, 7 Drawing Sheets

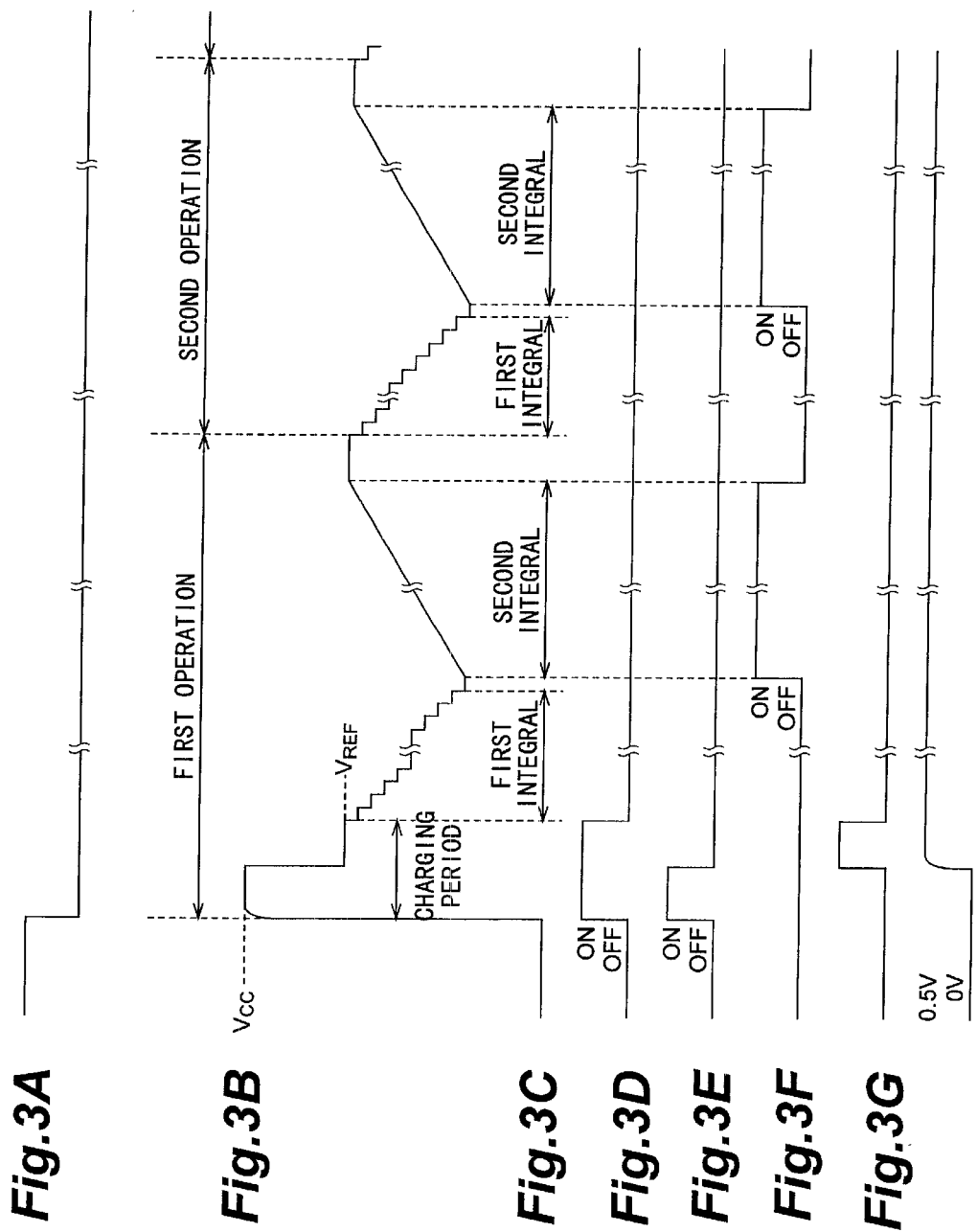

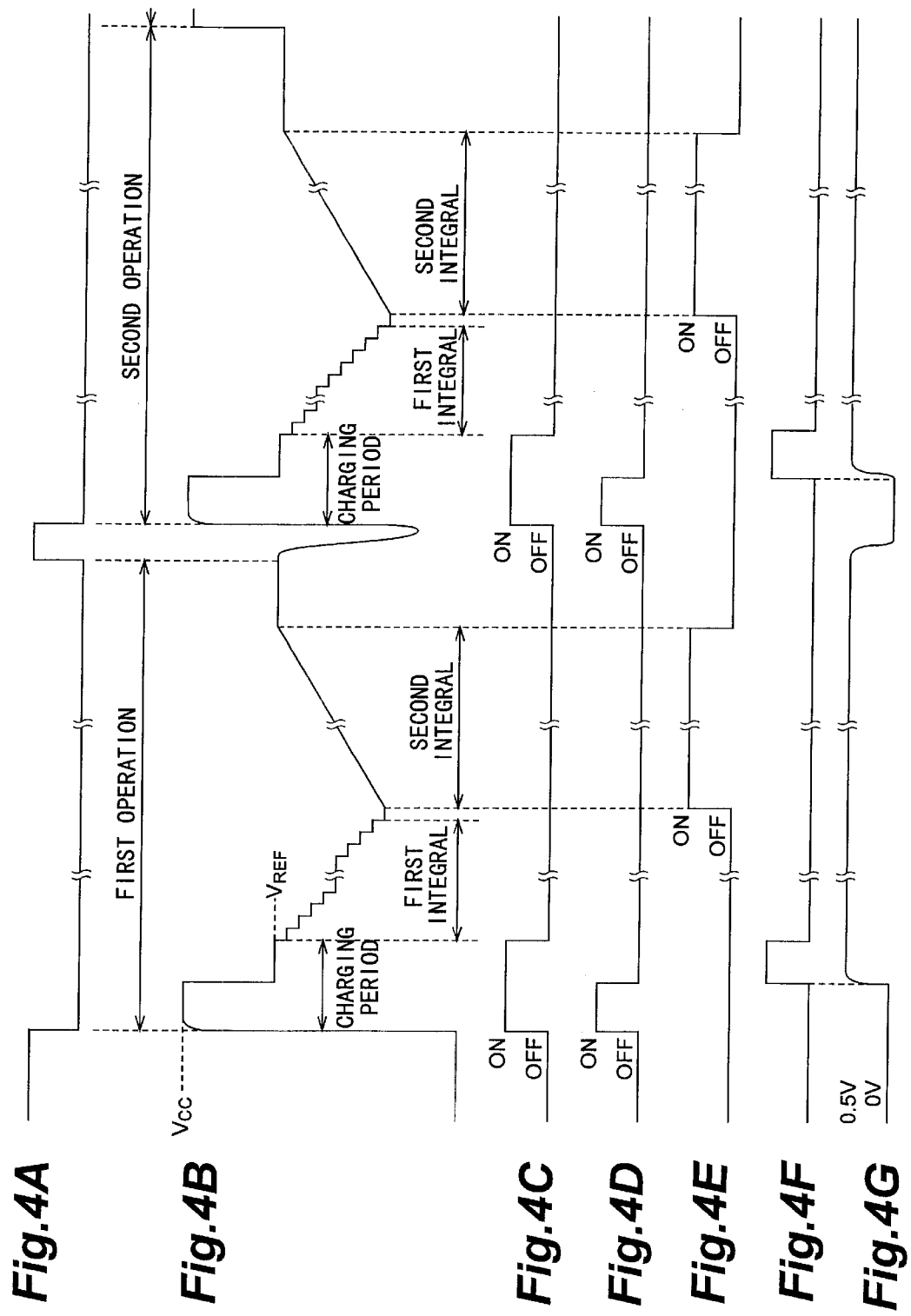

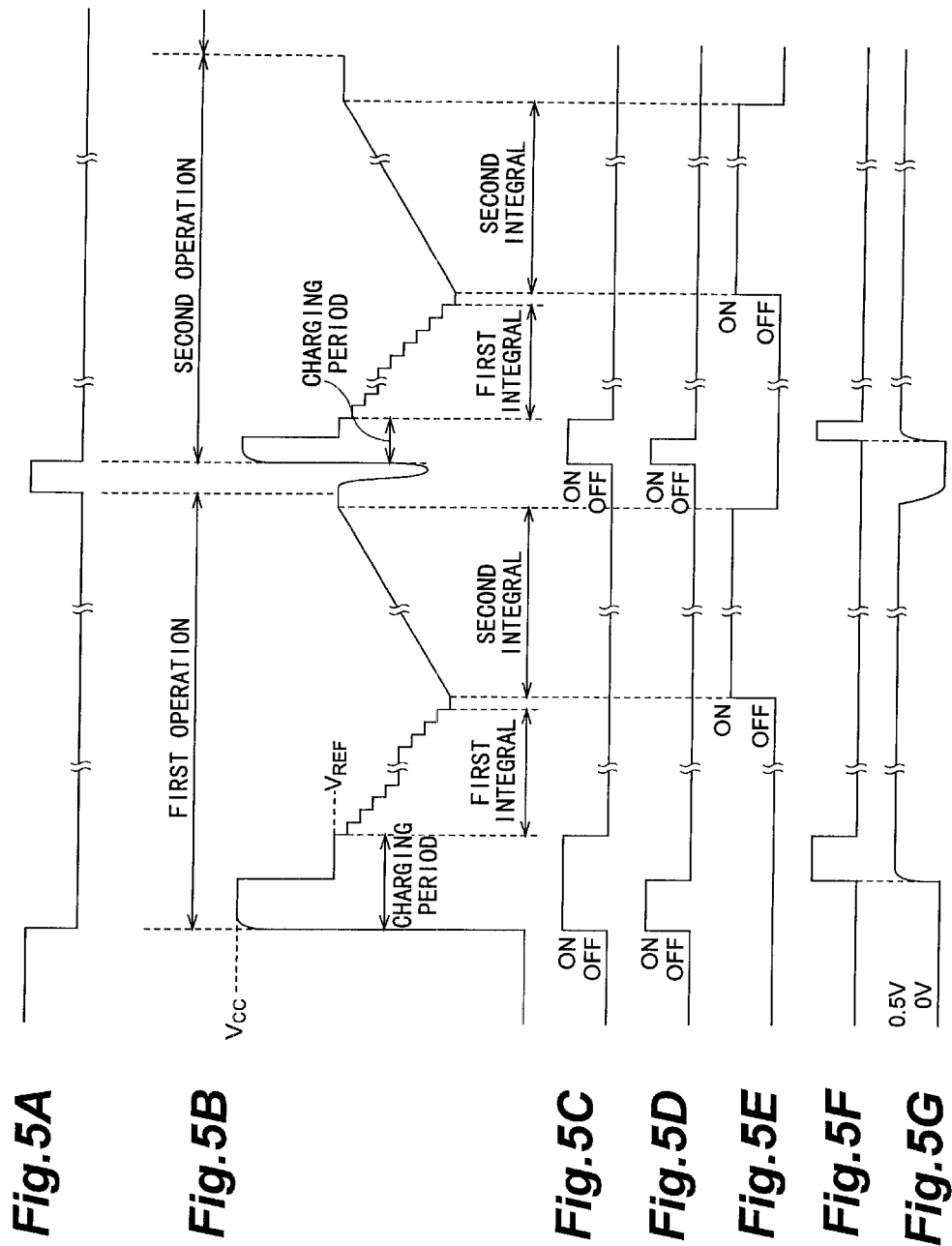

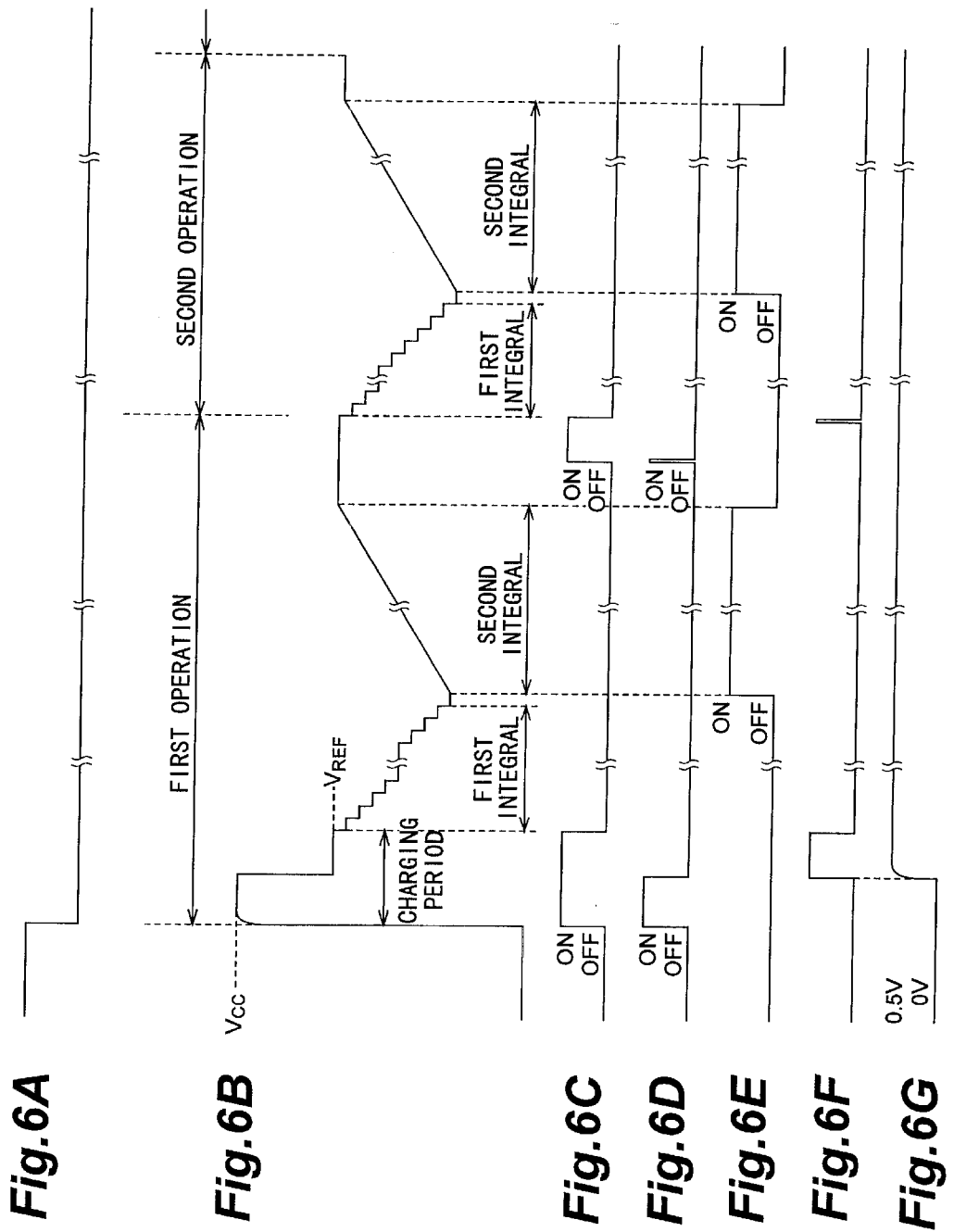

DISTANCE-MEASURING APPARATUS

BACKGROUND OF THE INVENTION

1. Field of the Invention

The present invention relates to a distance-measuring apparatus for measuring the distance to an object and, more particularly, to an active distance-measuring apparatus used in cameras and other equipment.

2. Related Background Art

The active distance-measuring apparatus used in the cameras etc. is arranged to project light from an infrared-emitting diode (hereinafter referred to as "IRED") toward the measured object, to receive reflected light of the projected light by a position sensing device (hereinafter referred to as "PSD"), to process a signal from this PSD by a signal processing circuit and an arithmetic circuit to output distance information, and to determine the distance to the measured object by a CPU. Since the distance measurement with only one projection of light can cause an error, it can be considered that a plurality of light projection operations are carried out to gain a plurality of distance information pieces and that the plurality of distance information pieces are integrated by an integrating circuit to be averaged. In this case, in the integrating circuit a fixed reference voltage is applied to an integrating capacitor and the integrating capacitor is gradually discharged according to each distance information. After completion of the predetermined number of light projection operations, the integrating capacitor is then charged by constant current to measure the time to the reference voltage, and the distance to the measured object can be computed based on the time.

SUMMARY OF THE INVENTION

In the distance-measuring apparatus described above, however, an error can arise in the result of the distance measurement, too. For example, when the reference voltage is applied to the integrating capacitor, the voltage between the terminals of the integrating capacitor becomes lower than the reference voltage because of dielectric polarization. For this reason, the charging time of the integrating capacitor is not related correctly to the distance to the measured object, so that the apparatus may fail to gain the accurate measurement result.

In order to avoid this problem, it can be contemplated that a voltage higher than the reference voltage is preliminarily applied to the integrating capacitor and then the voltage applied is changed to the reference voltage after a lapse of a certain time. In this case, however, the time for the measurement becomes longer by the time of the precharge at the voltage higher than the reference voltage. Particularly, where charge and discharge steps of the integrating capacitor are carried out several times to compute a plurality of distance measurement results and where the distance to the measured object is determined as an average of the results, the time of precharges is summed up to become longer, thus making great time parallax.

Therefore, the present invention has been accomplished in order to solve such a technical problem and an object of the present invention is to provide a distance-measuring apparatus that can obtain an accurate distance measurement result while decreasing the time parallax.

For accomplishing the above object, a distance-measuring apparatus according to the present invention is a distance-measuring apparatus comprising: light projecting means for projecting light toward a measured object; light receiving means for receiving reflected light of the light projected toward the measured object, at a photoreceptive position on a position sensing device according to a distance to the measured object and outputting a signal according to the photoreceptive position; arithmetic means for carrying out an arithmetic operation based on the output signal outputted from the light receiving means and outputting a distance signal according to the distance to the measured object; integrating means comprising an integrating capacitor, the integrating means carrying out a first integral in which the signal outputted from the arithmetic means is integrated by discharging/charging the integrating capacitor according to the signal outputted from the arithmetic means and thereafter carrying out a second integral by charging/discharging the integrating capacitor at a constant current, the integrating means comparing a voltage of the integrating capacitor with a reference voltage during the second integral and outputting a comparison result signal according to a result of the comparison; detecting means for detecting the distance to the measured object, based on the signal outputted from the integrating means; and charging means for carrying out precharge by preliminarily applying a constant voltage to the integrating capacitor, prior to execution of the first integral by the integrating means; wherein a plurality of distance measurement operations are carried out by repeatedly carrying out the projection of light by the light projecting means, the reception of light by the light receiving means, the arithmetic operation by the arithmetic means, and the integral operation by the integrating means and the detecting means detects the distance to the measured object, based on results of the respective distance measurement operations; and wherein the precharge by the charging means is carried out prior to the first distance measurement operation and the precharge is not carried out prior to the second and subsequent distance measurement operations.

The distance-measuring apparatus according to the present invention is also characterized in that the arithmetic means comprises a stationary-light-removing capacitor, the arithmetic means makes the stationary-light-removing capacitor store charge corresponding to an output level of the output signal of the light receiving means while the light projecting means projects no light, and the arithmetic means outputs the distance signal according to the distance to the measured object by removing an output component due to stationary light except for the light projected from the light projecting means out of the output signal of the light receiving means in accordance with a state of the storage of the stationary-light-removing capacitor while the light projecting means projects light, wherein the charging means carries out precharge by preliminarily applying a constant voltage to the stationary-light-removing capacitor, prior to execution of the first integral by the integrating means, and wherein the precharge of the integrating capacitor and the stationary-light-removing capacitor is carried out by the charging means prior to the first distance measurement operation and wherein the precharge of the integrating capacitor and the stationary-light-removing capacitor is not carried out prior to the second and later distance measurement operations.

According to the present invention, the apparatus can obtain the accurate distance, because the apparatus is arranged to carry out the plural distance measurement operations and compute the distance to the measured object, based on the results of the plural distance measurement operations. In addition, the apparatus can decrease the distance measurement time and decrease the time parallax between the start of shutter release operation and the end of exposure, because the apparatus is arranged not to carry out the precharge of the integrating capacitor or the stationary-light-removing capacitor in the second and subsequent distance measurement operations.

Another distance-measuring apparatus according to the present invention is a distance-measuring apparatus comprising: light projecting means for projecting light toward a measured object; light receiving means for receiving reflected light of the light projected toward the measured object, at a photoreceptive position on a position sensing device according to a distance to the measured object and outputting a signal according to the photoreceptive position; arithmetic means for carrying out an arithmetic operation based on the output signal outputted from the light receiving means and outputting a distance signal according to the distance to the measured object; integrating means comprising an integrating capacitor, the integrating means carrying out a first integral in which the signal outputted from the arithmetic means is integrated by discharging/charging the integrating capacitor according to the signal outputted from the arithmetic means and thereafter carrying out a second integral by charging/discharging the integrating capacitor at a constant current, the integrating means comparing a voltage of the integrating capacitor with a reference voltage during the second integral and outputting a comparison result signal according to a result of the comparison; detecting means for detecting the distance to the measured object, based on the signal outputted from the integrating means; and charging means for carrying out precharge by preliminarily applying a constant voltage to the integrating capacitor, prior to execution of the first integral by the integrating means; wherein a plurality of distance measurement operations are carried out by repeatedly carrying out the projection of light by the light projecting means, the reception of light by the light receiving means, the arithmetic operation by the arithmetic means, and the integral operation by the integrating means and the detecting means detects the distance to the measured object, based on results of the respective distance measurement operations; and wherein the precharge by the charging means is carried out prior to the first distance measurement operation and the precharge is carried out in a shorter time prior to the second and subsequent distance measurement operations than a time of the precharge prior to the first distance measurement operation.

The distance-measuring apparatus according to the present invention is also characterized in that the arithmetic means comprises a stationary-light-removing capacitor, the arithmetic means makes the stationary-light-removing capacitor store charge corresponding to an output level of the output signal of the light receiving means while the light projecting means projects no light, and the arithmetic means outputs the distance signal according to the distance to the measured object by removing an output component due to stationary light except for the light projected from the light projecting means out of the output signal of the light receiving means in accordance with a state of the storage of the stationary-light-removing capacitor while the light projecting means projects light, wherein the charging means carries out precharge by preliminarily applying a constant voltage to the stationary-light-removing capacitor, prior to execution of the first integral by the integrating means, and wherein the precharge of the integrating capacitor and the stationary-light-removing capacitor is carried out by the charging means prior to the first distance measurement operation and wherein the precharge of the integrating capacitor and the stationary-light-removing capacitor is carried out in a shorter time prior to the second and subsequent distance measurement operations than a time of the precharge prior to the first distance measurement operation.

According to the present invention, the apparatus can obtain the accurate distance, because the apparatus is arranged to carry out the plural distance measurement operations and compute the distance to the measured object, based on the results of the plural distance measurement operations. In addition, the apparatus can decrease the distance measurement time and decrease the time parallax between the start of shutter release operation and the end of exposure, because the apparatus is arranged to shorten the period of the precharge of the integrating capacitor or the stationary-light-removing capacitor in the second and subsequent distance measurement operations.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A to FIG. 3G are timing charts to show the operation of the distance-measuring apparatus of the first embodiment;

FIG. 4A to FIG. 4G are explanatory diagrams to explain the operation of a distance-measuring apparatus for comparison with the distance-measuring apparatus of the first embodiment;

FIG. 5A to FIG. 5G are timing charts to show the operation of the second embodiment of the distance-measuring apparatus according to the present invention; and FIG. 6A to FIG. 6G are timing charts to show the operation of the third embodiment of the distance-measuring apparatus according to the present invention.

DESCRIPTION OF THE PREFERRED EMBODIMENTS

The preferred embodiments of the present invention will be described with reference to the accompanying drawings. The following description is based on the examples in which the active distance-measuring apparatus is applied to the distance-measuring apparatus of an autofocusing camera.
(First Embodiment)

Figure 1:
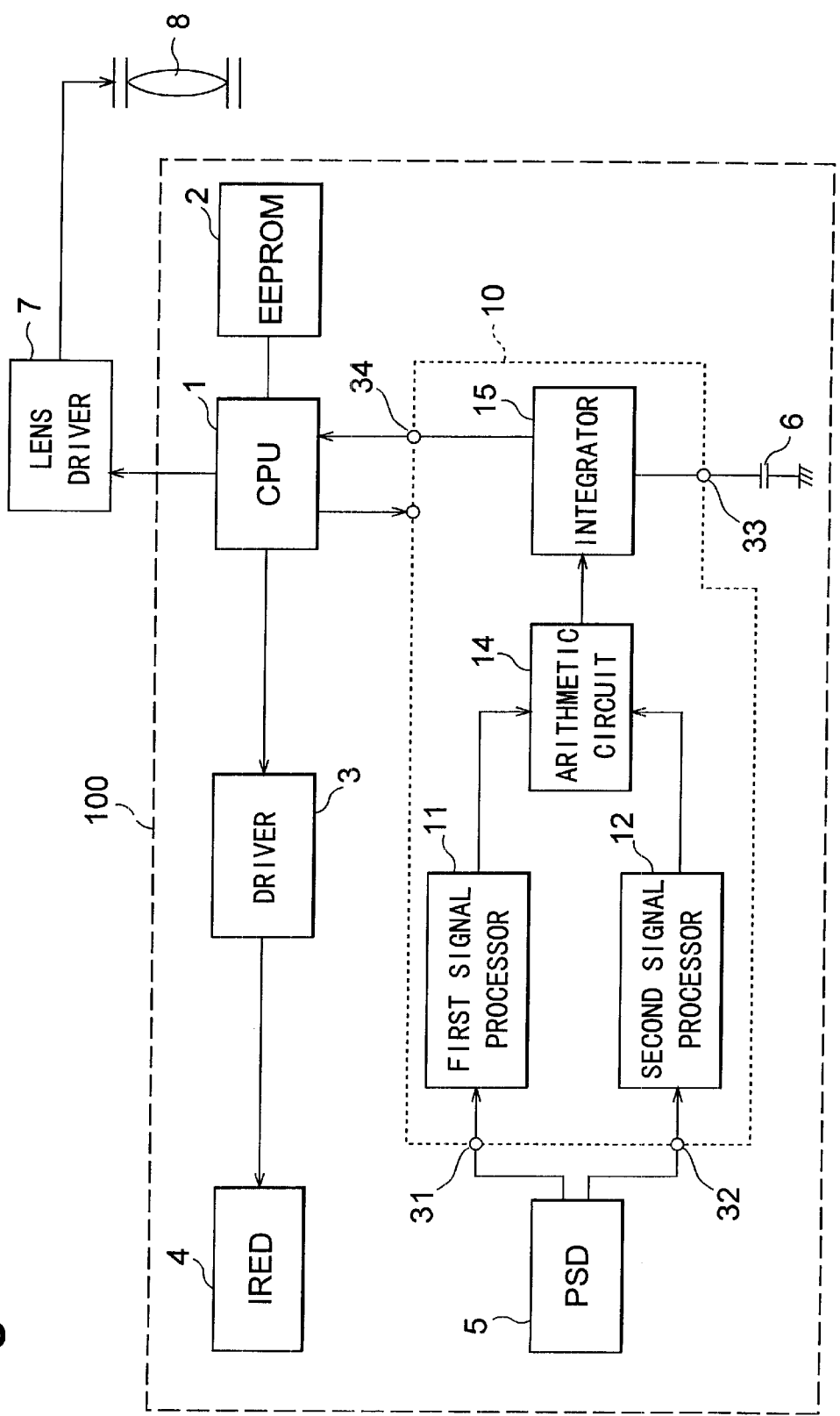
FIG. 1 is a structural diagram to show the first embodiment of the distance-measuring apparatus according to the present invention.

FIG. 1 is a structural diagram to show the distance-measuring apparatus 100 of the present embodiment. CPU 1 controls the whole of the camera equipped with this distance-measuring apparatus 100 and controls the whole camera including this distance-measuring apparatus 100, based on programs and parameters preliminarily stored in EEPROM 2. In this distance-measuring apparatus 100, the CPU 1 controls a driver 3 to control emission of infrared light from IRED (infrared-emitting diode) 4. The CPU 1 also controls the operation of autofocusing IC (hereinafter referred to as "AFIC") 10 and receives an AF signal outputted from the AFIC 10.

The infrared light emitted from the IRED 4 is projected through a projection lens (not illustrated) placed in front of the IRED 4, toward an object to be measured. The infrared light is reflected in part by the measured object and the reflected light is received somewhere on a photoreceptive surface of PSD 5 through a reception lens (not illustrated) placed in front of the PSD (position sensing device) 5. The light receiving position varies depending upon the distance to the measured object.

The PSD 5 outputs two signals $I_1$ and $I_2$ according to the reception position. The signal $I_1$ is a near-side signal which becomes greater with decrease of the distance to the measured object if optical energy of received light is constant. The signal $I_2$ is a far-side side signal which becomes greater with increase of the distance to the measured object if optical energy of received light is constant. The sum of the signals $I_1$ and $I_2$ represents optical energy of the reflected light received by the PSD 5. The near-side signal $I_1$ is sent to a PSDN terminal 31 of the AFIC 10 and the far-side signal $I_2$ to a PSDF terminal 32 of the AFIC 10. In practice, however, the AFIC 10 accepts signals in which a stationary light component $I_0$ is added to each of the near-side signal $I_1$ and the far-side signal $I_2$, depending upon external field conditions.

The AFIC 10 is an integrated circuit (IC) which is composed of a first signal processing circuit 11, a second signal processing circuit 12, an arithmetic circuit 14, and an integrating circuit 15. The first signal processing circuit 11 receives the signal $I_1+I_0$ outputted from the PSD 5 and removes the stationary light component $I_0$ from the signal to output the near-side signal $I_1$. The second signal processing circuit 12 receives the signal $I_2+I_0$ outputted from the PSD 5 and removes the stationary light component $I_0$ from the signal to output the far-side signal $I_2$.

The arithmetic circuit 14 receives the near-side signal $I_1$ outputted from the first signal processing circuit 11 and the far-side signal $I_2$ outputted from the second signal processing circuit 12 and computes an output ratio $(I_1/(I_1+I_2))$ to output an output ratio signal indicating the result of the computation. This output ratio $(I_1/(I_1+I_2))$ indicates the reception position on the photoreceptive surface of PSD 5, i.e., the distance to the measured object.

The integrating circuit 15 receives this output ratio signal and adds up a lot of output ratios in cooperation with an integrating capacitor 6 connected to a $C_{INT}$ terminal 33 of the AFIC 10, to improve an S/N ratio. The integral result of output ratios is outputted as an AF signal from an $S_{OUT}$ terminal 34 of the AFIC 10. The CPU 1 receives the AF signal outputted from the AFIC 10 and converts the AF signal to a distance signal by a predetermined arithmetic to send the distance signal to a lens driving circuit 7. The lens driving circuit 7 moves a taking lens 8 to an in-focus position, based on the distance signal.

The first signal processing circuit 11 and integrating circuit 15 of the AFIC 10 will be described in more detail below.

Figure 2:
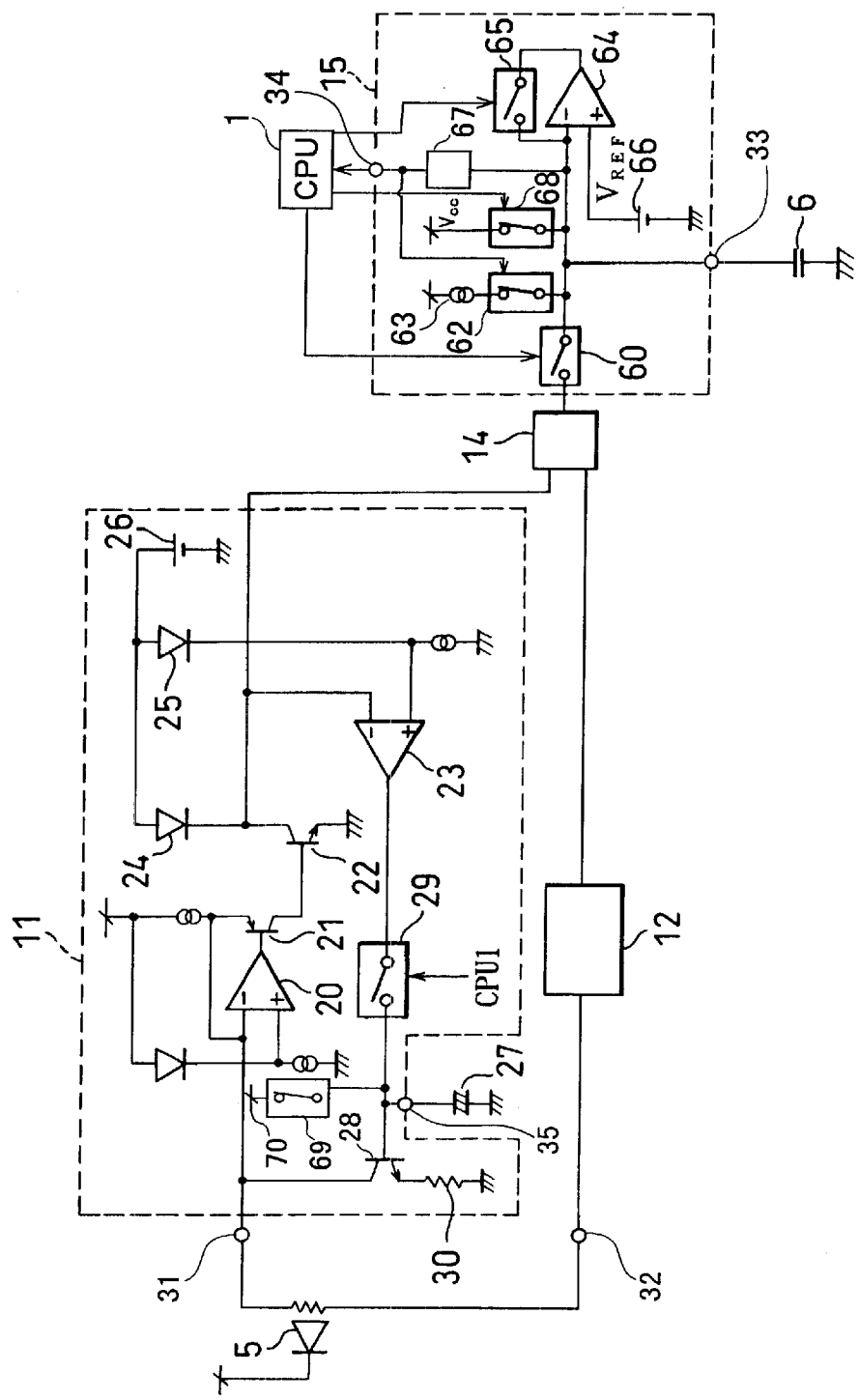
FIG. 2 is a circuit diagram of a first signal processing circuit and an integrating circuit in the distance-measuring apparatus of the first embodiment.

FIG. 2 is a circuit diagram of the first signal processing circuit 11 and the integrating circuit 15. The configuration of the second signal processing circuit 12 is also similar to that of the first signal processing circuit 11. As described above, the first signal processing circuit 11 is the circuit which receives the near-side signal $I_1$ plus the stationary light component $I_0$ outputted from the PSD 5 and removes the stationary light component $I_0$ therefrom to output the near-side signal $I_1$. Namely, a near-side terminal of the PSD 5 is connected via the PSDN terminal 31 of the AFIC 10 to a negative input terminal of an operational amplifier 20 of the first signal processing circuit 11.

An output terminal of the operational amplifier 20 is connected to a base terminal of transistor 21 and a collector terminal of the transistor 21 is connected to a base terminal of transistor 22. A collector terminal of the transistor 22 is connected to a negative input terminal of operational amplifier 23 and also connected to the arithmetic circuit 14. Further, a cathode terminal of compressing diode 24 is connected to the collector terminal of the transistor 22 and a cathode terminal of compressing diode 25 is connected to a positive input terminal of the operational amplifier 23. A power supply 26 is connected to an anode terminal of each of these compressing diodes 24 and 25.

A capacitor 27 for removing the stationary light is externally attached to a CHF terminal 35 of the AFIC 10, whereby this capacitor 27 for removal of stationary light is connected to a base terminal of transistor 28 for removal of stationary light in the first signal processing circuit 11. The capacitor 27 and the operational amplifier 23 are connected to each other through a switch 29 and the CPU 1 controls on/off of this switch 29. A collector terminal of the transistor 28 for removal of stationary light is connected to the negative input terminal of the operational amplifier 20 and an emitter terminal of the transistor 28 is grounded through a resistor 30.

The integrating circuit 15 has the following configuration. The integrating capacitor 6 externally attached to the $C_{INT}$ terminal 33 of the AFIC 10 is connected through a switch 60 to an output terminal of the arithmetic circuit 14 and through a switch 62 to a constant-current source 63. The integrating capacitor 6 is also connected through a switch 65 to an output terminal of an operational amplifier 64 and connected directly to a negative input terminal of the operational amplifier 64. Further, a potential of the integrating capacitor 6 is outputted from the $S_{OUT}$ terminal 34 of the AFIC 10. These switches 60, 62, and 65 are controlled by a control signal from the CPU 1. A second reference voltage supply 66 is connected to a positive input terminal of the operational amplifier 64. The reference voltage supply 66 is a dc power supply which supplies the reference voltage $V_{REF}$ to the operational amplifier 64.

A comparator 67 is coupled to the negative input terminal of the operational amplifier 64. The comparator 67 reads in the voltage of the integrating capacitor 6 and outputs a signal to each of the CPU 1 and the switch 62 when the voltage of the integrating capacitor 6 becomes the reference voltage $V_{REF}$ or higher. When receiving the output signal from the comparator 67, the switch 62 is turned off to stop charging of the integrating capacitor 6 from the constant-current source 63. A switch 68 is coupled between the integrating capacitor 6 and a power-supply line. The switch 68 is one which is turned on or off in response to a command signal from the CPU 1 and which supplies the voltage $V_{CC}$ higher than the reference voltage $V_{REF}$ to the integrating capacitor 6 in the on state and stops the supply of the voltage $V_{CC}$ in the off state.

The schematic action of this AFIC 10 will be described below referring to FIG. 1 and FIG. 2.

The CPU 1 keeps the switch 29 of the first signal processing circuit 11 on while the IRED4 emits no light. At this time the stationary light component $I_0$ outputted from the PSD 5 is put into the first signal processing circuit 11, and the current is amplified by the current amplifier composed of the operational amplifier 20, the transistor 21, and the transistor 22. The amplified current is logarithmically compressed by the compressing diode 24 to be converted into a voltage signal, and this voltage signal is put into the negative input terminal of the operational amplifier 23. If a large signal enters the operational amplifier 20, the cathode potential of the compressing diode 24 becomes high and thus the operational amplifier 23 outputs a large signal to charge the capacitor 27 for removal of stationary light. Then base current is supplied to the transistor 28, and thus collector current flows in the transistor 28, so as to lower the signal supplied to the operational amplifier 20 among the signal $I_0$ inputted into the first signal processing circuit 11. In a stable state of the operation of this closed loop, all the signal $I_0$ inputted into the first signal processing circuit 11 flows to the transistor 28 and the capacitor 27 for removal of stationary light stores charge corresponding to the base current at that time.

When the CPU 1 turns the switch 29 off with emission of the IRED 4, the stationary light component $I_0$ out of the signal $I_1+I_0$ outputted from the PSD 5 at this time flows as collector current to the transistor 28 to which the base potential is applied by the charge stored in the capacitor 27 for removal of stationary light. The near-side signal $I_1$ is current-amplified by the current amplifier comprised of the operational amplifier 20, the transistor 21, and the transistor 22 and is logarithmically compressed by the compressing diode 24 into a voltage signal to be outputted. Namely, the first signal processing circuit 11 outputs only the near-side signal $I_1$ after the removal of the stationary light component $I_0$ and the near-side signal $I_1$ is supplied to the arithmetic circuit 14. On the other hand, the second signal processing circuit 12 also outputs only the far-side signal $I_2$ after removal of the stationary light component $I_0$, as the first signal processing circuit 11 did, and the far-side signal $I_2$ is supplied to the arithmetic circuit 14.

The near-side signal $I_1$ outputted from the first signal processing circuit 11 and the far-side signal $I_2$ outputted from the second signal processing circuit 12 are put into the arithmetic circuit 14, and the arithmetic circuit 14 computes and outputs the output ratio $(I_1/(I_1+I_2))$. The output ratio is put into the integrating circuit 15. While the IRED 4 emits the predetermined number of pulses, the switch 60 of the integrating circuit 15 is kept on and the switches 62 and 65 off; therefore, the output ratio signal outputted from the arithmetic circuit 14 is stored in the integrating capacitor 6. After the end of the emission of the predetermined number of pulses, the switch 60 is turned off and the switch 65 is turned on. Thus the charge stored in the integrating capacitor 6 decreases because of charge of an opposite potential supplied from the output terminal of the operational amplifier 64.

The CPU 1 monitors the potential of the integrating capacitor 6 to measure the time necessary for a return to the original potential, obtains the AF signal based on the time, and further computes the distance to the measured object.

The operation of the distance-measuring apparatus of the present embodiment will be described below.

FIGS. 3A to 3G are timing charts of the operation; FIG. 3A shows the standby state of the AFIC, FIG. 3B the charging voltage of the integrating capacitor 6, FIG. 3C the operation of the switch 65, FIG. 3D the operation of the switch 68, FIG. 3E the operation of the switch 62, FIG. 3F the operation of switch 69, and FIG. 3G the charging voltage of the capacitor 27 for removal of stationary light.

When the shutter release button of the camera is depressed by a half stroke to activate the distance measurement, the AFIC 10 actuates an internal standby circuit (not illustrated) to restart the supply of power-supply voltage to turn the switch 65 and switch 68 on, whereupon the voltage $V_{CC}$ is applied to the integrating capacitor 6 to overcharge it. This overcharge promotes the dielectric polarization of the integrating capacitor 6. After a lapse of a fixed time since the overcharge, the switch 68 is turned off to apply the reference voltage $V_{REF}$ to the integrating capacitor 6 to carry on the precharge. During this period of the precharge of the integrating capacitor 6, the capacitor 27 for removal of stationary light is also precharged. This precharge of the capacitor 27 for removal of stationary light can be implemented, for example, by connecting the switch 69 between the capacitor 27 and a power-supply line 70 capable of supplying a constant voltage and turning the switch 69 on at the timing of a rise of FIG. 3F to supply the constant voltage to the capacitor 27. Then the switch 65 is turned off a fixed time after the start of the precharge, thus completing the precharge.

Then the driver 3 is actuated by a signal from the CPU 1 to make the IRED 4 emit pulses of infrared light. The infrared light emitted from the IRED 4 is reflected by the measured object and thereafter received by the PSD 5. On the other hand, at the same time as the emission of the IRED 4, the switch 29 of the first signal processing circuit 11 is turned off to put the near-side signal $I_1$ after the removal of the stationary light component $I_0$ into the arithmetic circuit 14. Similarly, the far-side signal $I_2$ after the removal of the stationary light component $I_0$ is supplied from the second signal processing circuit 12 into the arithmetic circuit 14.

The arithmetic circuit 14 outputs the data of output ratio $I_1/(I_1+I_2)$ based on the near-side signal $I_1$ and far-side signal $I_2$. As soon as this output becomes stable, the switch 60 of the integrating circuit 15 is turned on to put the negative voltage corresponding to the output ratio outputted from the arithmetic circuit 14, into the integrating capacitor 6.

The switch 60 of the integrating circuit 15 is turned off at the same time as off of the IRED 4. After a lapse of a signal error time, the switch 29 of the first signal processing circuit 11 is turned on to start storage of the stationary light component $I_0$ of the output signal outputted from the PSD 5, in the capacitor 27 for removal of stationary light.

The integrating capacitor 6 of the integrating circuit 15 accepts the output ratio or distance information signal outputted from the arithmetic circuit 14 to discharge by a voltage value according to a value of the distance information signal. Namely, as illustrated in FIG. 3B, the distance information signal enters the integrating capacitor 6 every emission of a pulse from the IRED 4 to decrease the voltage of the integrating capacitor 6 stepwise (first integral). A voltage drop amount of each step itself is distance information corresponding to the distance to the measured object, but in the present embodiment the distance information is obtained as the sum of voltage drop amounts obtained by emission of respective pulses from the IRED 4.

After completion of the input by the predetermined number of emissions to the integrating capacitor 6, the switch 60 is kept off and the switch 62 is turned on by a signal from the CPU 1. This causes the integrating capacitor 6 to charge at a constant rate determined by the rating of the constant-current source 63 (second integral).

During the period of this second integral the comparator 67 compares the voltage of the integrating capacitor 6 with the reference voltage $V_{REF}$ and terminates the charging of the integrating capacitor 6 by turning the switch 62 off with agreement between them. The CPU 1 measures the time necessitated for the second integral. Since the charging rate by the constant-current source 63 is constant, the distance to the measured object in the first distance measurement can be computed from the time required for the second integral.

After a lapse of a fixed time t (for example, 1 ms) since the completion of output of the signal including the time of the second integral from the integrating circuit 15 to the CPU 1, the second distance measurement is started without execution of the overcharge and precharge of the integrating capacitor 6 and the capacitor 27 for removal of stationary light.

Specifically, the CPU 1 outputs a signal to the driver 3 to actuate the driver 3 so as to make the IRED 4 emit pulses of infrared light. At the same time as the emission of the IRED 4, the switch 29 of the first signal processing circuit 11 is turned off to put the near-side signal $I_1$ after the removal of the stationary light component $I_0$ into the arithmetic circuit 14. Further, the second signal processing circuit 12 supplies the far-side signal $I_2$ after the removal of the stationary light component $I_0$ into the arithmetic circuit 14. Then the arithmetic circuit 14 outputs the data of output ratio $I_1/(I_1+I_2)$ based on the near-side signal $I_1$ and the far-side signal $I_2$, and the negative voltage corresponding to the output ratio is put into the integrating capacitor 6.

After completion of input by the predetermined number of emissions to the integrating capacitor 6, the switch 60 is kept off and the switch 62 is turned on by a signal from the CPU 1. This causes the integrating capacitor 6 to charge at the constant rate determined by the rating of the constant-current source 63 (second integral).

During the period of this second integral the comparator 67 compares the voltage of the integrating capacitor 6 with the reference voltage $V_{REF}$ and terminates the charging of the integrating capacitor 6 by turning the switch 62 off with agreement between them. The CPU 1 measures the time required for the second integral. Since the charging rate by the constant-current source 63 is constant, the distance to the measured object in the second distance measurement can be computed from the time required for the second integral.

After a lapse of the fixed time t (for example, 1 ms) since the output of the signal including the time of the second integral in the second distance measurement from the integrating circuit 15 to the CPU 1, the third distance measurement is then started without execution of the overcharge and precharge of the integrating capacitor 6 and the capacitor 27 for removal of stationary light. This third distance measurement is carried out in a similar fashion to the second distance measurement described above.

After execution of a plurality of distance measurement operations, the CPU 1 computes the distance to the measured object, based on the measurement results obtained in the respective measurements.

When the shutter release button is depressed thereafter by a full stroke, the CPU 1 controls the lens driving circuit 7, based on the distance thus computed, to move the taking lens 8 to an appropriate in-focus position and then opens the shutter (not illustrated) to effect exposure. With the shutter release operation, the series of photographing operations, including the precharge, distance measurement (first integral and second integral), focusing, and exposure, are carried out in the above-stated manner.

As described above, the distance-measuring apparatus of the present embodiment can obtain the accurate distance, because it is arranged to carry out a plurality of distance measurement operations and compute the distance to the measured object, based on the results of the plural distance measurement operations. After a lapse of the fixed time since the completion of the second integral in the first distance measurement, the next distance measurement is started without execution of the overcharge and precharge of the integrating capacitor 6 and the capacitor 27 for removal of stationary light, whereby the distance measurement time can be decreased and whereby the time parallax can be reduced between the start of the shutter release operation and the end of exposure.

For example, let us suppose that the overcharge and precharge of the integrating capacitor 6 etc. were also carried out in the second distance measurement operation and thereafter, as illustrated in FIG. 4A to FIG. 4G, in the same manner as in the first distance measurement operation. The measurement time for the second measurement or thereafter would be equal to that for the first measurement and a long time would be necessary for the measurement, because the same operation as the first measurement is carried out repeatedly in the second and subsequent measurements. In contrast with it, after completion of the first distance measurement, the integrating capacitor 6 is back to the reference voltage, which was applied at the start of the first distance measurement, and thus a measurement error due to the dielectric polarization will not arise even without charging of the integrating capacitor 6 at the start of the second distance measurement. Since the capacitor 27 for removal of stationary light is also maintained at the level of removal of stationary light in the first operation, the measurement error due to the dielectric polarization will not occur even without charging of the capacitor 27 for removal of stationary light at the start of the second distance measurement. Therefore, when in the second and subsequent distance measurement operations the measurement is started without the overcharge and precharge of the integrating capacitor 6 and the capacitor 27 for removal of stationary light, no measurement error arises and the distance measurement time is reduced, so as to decrease the time parallax.

Figure 3H:
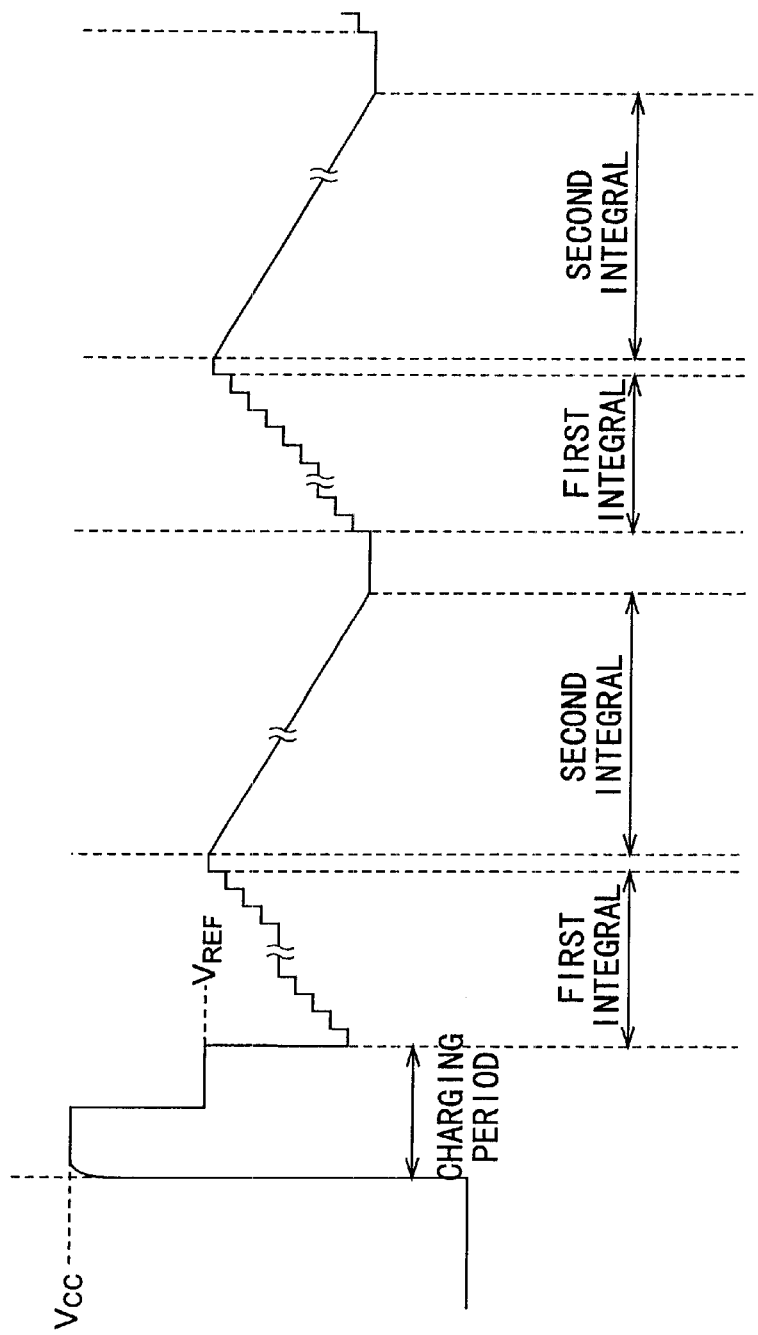
FIG. 3H is a timing chart to show a modification of the distance-measuring apparatus of the first embodiment.

It is noted that the present invention is by no means limited to the above embodiment but may involve various modifications and changes. For example, as illustrated in FIG. 3H, the present invention can also be applied to cases wherein the charge and discharge of the integrating circuit are reverse to those in the above embodiment, i.e., to the integrating circuits in which the first integral includes a plurality of charging steps so as to increase the voltage of the integrating capacitor stepwise and thereafter the second integral is carried out by a single discharge operation.

(Second Embodiment)

The second embodiment of the distance-measuring apparatus according to the present invention will be described below.

The distance-measuring apparatus of the first embodiment described above was arranged not to carry out the overcharge and precharge of the integrating capacitor 6 etc. in the second and subsequent measurements, whereas the distance-measuring apparatus of the present embodiment is arranged so that the overcharge and precharge of the integrating capacitor 6 etc. are also carried out in the second and subsequent measurements but the overcharge and precharge are carried out within a shorter time in the second and subsequent measurements than the charging period of the overcharge and precharge in the first measurement. The distance-measuring apparatus of the present embodiment has the structure similar to that of the distance-measuring apparatus of the first embodiment illustrated in FIG. 1 and FIG. 2.

FIG. 5A to FIG. 5G are timing charts of the operation of the distance-measuring apparatus of the present embodiment. FIG. 5A to FIG. 5G correspond to the respective operations of FIG. 3A to FIG. 3G.

As illustrated in FIGS. 5A to 5G, the first distance measurement in the distance-measuring apparatus of the present embodiment is carried out in the same manner as in the distance-measuring apparatus of the first embodiment. After completion of the first distance measurement, the integrating capacitor 6 is then charged. Specifically, the switch 65 and switch 68 are turned on to apply the voltage $V_{CC}$ to the integrating capacitor 6 to effect the overcharge. This overcharge is carried out in a shorter time than the period of the overcharge in the first measurement. After a lapse of a fixed time since the overcharge, the switch 68 is turned off to apply the reference voltage $V_{REF}$ to the integrating capacitor 6 to effect the precharge in succession. This precharge is also carried out in a shorter time than the period of the precharge in the first measurement. The capacitor 27 for removal of stationary light is also precharged within the period of the precharge of the integrating capacitor 6.

After completion of the charging, the CPU 1 then outputs a signal to the driver 3 to actuate the driver 3 so that the IRED 4 emits pulses of infrared light in the same manner as in the first measurement. At the same time as the emission of the IRED 4, the switch 29 of the first signal processing circuit 11 is turned off to put the near-side signal $I_1$ after the removal of the stationary light component $I_0$ into the arithmetic circuit 14. Further, the second signal processing circuit 12 supplies the far-side signal $I_2$ after the removal of the stationary light component $I_0$ into the arithmetic circuit 14. Then the arithmetic circuit 14 outputs the data of output ratio $I_1/(I_1+I_2)$ based on the near-side signal $I_1$ and the far-side signal $I_2$, and the negative voltage corresponding to the output ratio is put into the integrating capacitor 6.

After the end of input by the predetermined number of emissions to the integrating capacitor 6, the switch 60 is kept off and the switch 62 is turned on by a signal from the CPU 1. This causes the integrating capacitor 6 to charge at the constant rate determined by the rating of the constant-current source 63 (second integral).

During the period of this second integral the comparator 67 compares the voltage of the integrating capacitor 6 with the reference voltage $V_{REF}$ and terminates the charging of the integrating capacitor 6 by turning the switch 62 off with agreement between them. The CPU 1 measures the time required for the second integral. Since the charging rate by the constant-current source 63 is constant, the distance to the measured object in the second distance measurement can be computed from the time required for the second integral.

After a lapse of the fixed time t (for example, 1 ms) since the output of the signal including the time of the second integral in the second distance measurement from the integrating circuit 15 to the CPU 1, the third distance measurement is started with execution of the overcharge and precharge of the integrating capacitor 6 and the capacitor 27 for removal of stationary light in the shorter time. This third distance measurement is carried out in a similar fashion to the second distance measurement described above.

After execution of a plurality of distance measurement operations, the CPU 1 computes the distance to the measured object, based on the measurement results obtained in the respective measurements.

When the shutter release button is depressed thereafter by a full stroke, the CPU 1 controls the lens driving circuit 7, based on the distance thus computed, to move the taking lens 8 to an appropriate in-focus position and then opens the shutter (not illustrated) to effect exposure. With the shutter release operation, the series of photographing operations, including the precharge, distance measurement (first integral and second integral), focusing, and exposure, are carried out in the above-stated manner.

As described above, the distance-measuring apparatus of the present embodiment can obtain the accurate distance, because it is arranged to carry out a plurality of distance measurement operations and compute the distance to the measured object, based on the results of the plural distance measurement operations. After the first distance measurement, the charging of the integrating capacitor 6 and the capacitor 27 for removal of stationary light is then carried out in the shorter time than the charging time before the first distance measurement, whereby the distance measurement time can be decreased and whereby the time parallax can be reduced between the start of the shutter release operation and the end of exposure. Since the overcharge and precharge of the integrating capacitor 6 and the capacitor 27 for removal of stationary light are also carried out in the second and subsequent measurements, the measurement error due to the dielectric polarization thereof can be prevented for sure.

(Third Embodiment)

The third embodiment of the distance-measuring apparatus according to the present invention will be described below.

The distance-measuring apparatus of the second embodiment was arranged to carry out the overcharge and precharge of the both integrating capacitor 6 and capacitor 27 for removal of stationary light in the second and subsequent measurements, whereas the distance-measuring apparatus of the present embodiment is arranged to carry out only the precharge of the integrating capacitor 6 in the second and subsequent measurements.

FIG. 6A to FIG. 6G are timing charts of the operation of the distance-measuring apparatus of the present embodiment. FIG. 6A to FIG. 6G correspond to the respective operations of FIG. 3A to FIG. 3G.

In the distance-measuring apparatus of the present embodiment, an on period of the switch 68 in the second distance measurement is short, as illustrated in FIG. 6D, so that the overcharge does not occur in the integrating capacitor 6. On the other hand, the switch 65 is kept on for a fixed time, as illustrated in FIG. 6C, so that the precharge of the integrating capacitor 6 is effected at the reference voltage $V_{REF}$ during that period. Since the on period of the switch 69 in the second distance measurement is short, the capacitor 27 for removal of stationary light is not charged.

In this distance-measuring apparatus, the capacitor 27 for removal of stationary light is maintained at the level of removal of stationary light after the first distance measurement, and thus the measurement error due to the dielectric polarization will not arise even without again executing the charging of the capacitor 27.

As described above, the present invention permits the apparatus to obtain the accurate distance, because the apparatus is arranged to carry out a plurality of distance measurement operations and compute the distance to the measured object, based on the results of the plural measurements. In addition, the apparatus according to the present invention is also arranged to execute no preliminary charge of the integrating capacitor or the capacitor for removal of stationary light in the second and subsequent distance measurements or to shorten the period of the preliminary charge of the integrating capacitor or the capacitor for removal of stationary light, whereby the distance measurement time can be decreased and whereby the time parallax can be reduced between the start of the shutter release operation and the end of exposure.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance-measuring apparatus comprising:

light projecting means for projecting light toward an object at a distance to be measured;

light detecting means for detecting light of the light projected toward that is reflected from the object, at a position on a position sensing photodetector device according to the distance to the object and outputting a signal according to the position on the position sensing photodetector device;

arithmetic means for carrying out an arithmetic operation based on the output signal output from said light detecting means and outputting a distance signal according to the distance to the object;

an integrating capacitor;

integrating means carrying out a first integration in which the signal output from said arithmetic means is integrated by discharging/charging said integrating capacitor according to the signal output from said arithmetic means and, thereafter, carrying out a second integration by charging/discharging said integrating capacitor with a constant current, said integrating means comparing a voltage of said integrating capacitor with a reference voltage during the second integration and outputting a comparison result signal according to a result of the comparison;

detecting means for detecting the distance to the object, based on the comparison result output from said integrating means; and charging means for precharging, by preliminarily applying a constant voltage to said integrating capacitor, prior to the first integration by said integrating means, wherein a plurality of distance measurement operations are carried out, each distance measurement operation measuring the distance to the object, by repeatedly projecting light from said light projecting means, detecting reflected light with said light detecting means, arithmetic operation of said arithmetic means, and integration by said integrating means, and said detecting means detects the distance to the object, based on results of the plurality of distance measurement operations, and the precharging by said charging means is carried out prior to a first distance measurement operation but not between the first distance measurement operation and second and subsequent distance measurement operations of the plurality of distance measurement operations.

2. The distance-measuring apparatus according to claim 1, comprising a stationary-light-removing capacitor, wherein said arithmetic means charges said stationary-light-removing capacitor to store a charge corresponding to an output level of the output signal of said light detecting means while said light projecting means projects no light, and said arithmetic means outputs the distance signal according to the distance to the object by removing an output component due to stationary light, except for the light projected from said light projecting means, from the output signal of said light detecting means in accordance with charge stored in said stationary-light-removing capacitor while said light projecting means projects light, said charging means precharges by preliminarily applying a constant voltage to said stationary-light-removing capacitor, prior to execution of the first integration by said integrating means, and precharging of said integrating capacitor and said stationary-light-removing capacitor is carried out by said charging means prior to the first distance measurement operation but no precharging of said integrating capacitor and said stationary-light-removing capacitor is carried out between the first measurement operation and the second and subsequent distance measurement operations of the plurality of distance measurement operations.

3. The distance-measuring apparatus according to claim 1, for focusing a lens.

4. The distance-measuring apparatus according to claim 1, wherein said light projecting means is an infrared-emitting diode.

5. The distance-measuring apparatus according to claim 1, wherein said light detecting means outputs a near-side signal which increases with decreasing distance to the object and a far-side signal which increases with increasing distance to the object.

6. The distance-measuring apparatus according to claim 5, wherein said arithmetic means outputs the distance signal, based on a ratio of the near-side signal and the far-side signal.

7. The distance-measuring apparatus according to claim 1, wherein said arithmetic means and said integrating means are integrated in a single autofocusing integrated circuit (IC).

8. The distance-measuring apparatus according to claim 1, wherein said charging means precharges by applying a voltage sufficient to induce dielectric polarization of said integrating capacitor.

9. A distance-measuring apparatus comprising:

light projecting means for projecting light toward an object at a distance to be measured;

light detecting means for detecting light of the light projected toward that is reflected from the object, at a position on a position sensing photodetector device according to the distance to the object and outputting a signal according to the photoreceptive position on the position sensing photodetector device;

arithmetic means for carrying out an arithmetic operation based on the output signal output from said light detecting means and outputting a distance signal according to the distance to the object;

an integrating capacitor;

integrating means carrying out a first integration in which the signal output from said arithmetic means is integrated by discharging/charging said integrating capacitor according to the signal output from said arithmetic means and, thereafter, carrying out a second integration by charging/discharging said integrating capacitor with a constant current, said integrating means comparing a voltage of said integrating capacitor with a reference voltage during the second integration and outputting a comparison result signal according to a result of the comparison;

detecting means for detecting the distance to the object, based on the comparison result output from said integrating means; and charging means for precharging, by preliminarily applying a constant voltage to said integrating capacitor, prior to the first integration by said integrating means, wherein a plurality of distance measurement operations are carried out, each distance measurement operation measuring the distance to the object, by repeatedly projecting light from said light projecting means, detecting reflected light with said light detecting means, arithmetic operation of said arithmetic means, and integration by said integrating means, and said detecting means detects the distance to the object, based on results of the plurality of distance measurement operations and the precharging by said charging means is carried out prior to a first distance measurement operation during a first time period and the precharging is carried out during a second time period, shorter than the first time period, between the first measurement operation and the second distance measurement operation and between each subsequent pair of distance measurement operations.

10. The distance-measuring apparatus according to claim 9, comprising a stationary-light-removing capacitor, wherein said arithmetic means charges said stationary-light-removing capacitor to store a charge corresponding to an output level of the output signal of said light detecting means while said light projecting means projects no light, and said arithmetic means outputs the distance signal according to the distance to the object by removing an output component due to stationary light, except for the light projected from said light projecting means, from the output signal of said light detecting means in accordance with charge stored in said stationary-light-removing capacitor while said light projecting means projects light, said charging means precharges by preliminarily applying a constant voltage to said stationary-light-removing capacitor, prior to execution of the first integration by said integrating means, and precharging of said integrating capacitor and said stationary-light-removing capacitor is carried out by said charging means prior to the first distance measurement operation during the first time period and precharging of said integrating capacitor and precharging of said stationary-light-removing capacitor are carried out in the second time period, shorter than the first time period, between the first distance measurement operation and the second distance measurement operation and between each subsequent pair of distance measurement operations.

11. The distance-measuring apparatus according to claim 9, for focusing a lens.

12. The distance-measuring apparatus according to claim 9, wherein said light projecting means is an infrared-emitting diode.

13. The distance-measuring apparatus according to claim 9, wherein said light detecting means outputs a near-side signal which increases with decreasing distance to the object and a far-side signal which increases with increasing distance to the object.

14. The distance-measuring apparatus according to claim 13, wherein said arithmetic means outputs the distance signal, based on a ratio of the near-side signal and said far-side signal.

15. The distance-measuring apparatus according to claim 9, wherein said arithmetic means and said integrating means are integrated in a single autofocusing integrated circuit (IC).

16. The distance-measuring apparatus according to claim 9, wherein said charging means precharges by applying a voltage sufficient induce dielectric polarization of said integrating capacitor.

* * * * *